Figure 1:
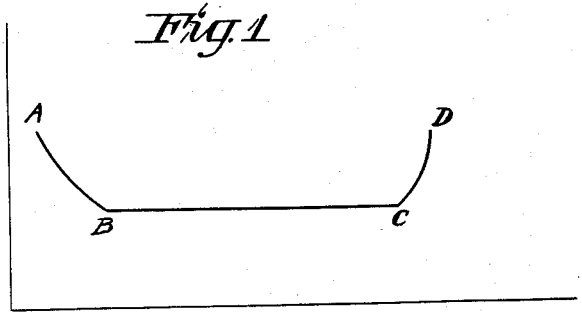

Aug. 27, 1935.   N. G. A. GUSTAFSSON   2,012,665
CARBURETOR
Filed May 7, 1930   5 Sheets-Sheet 1

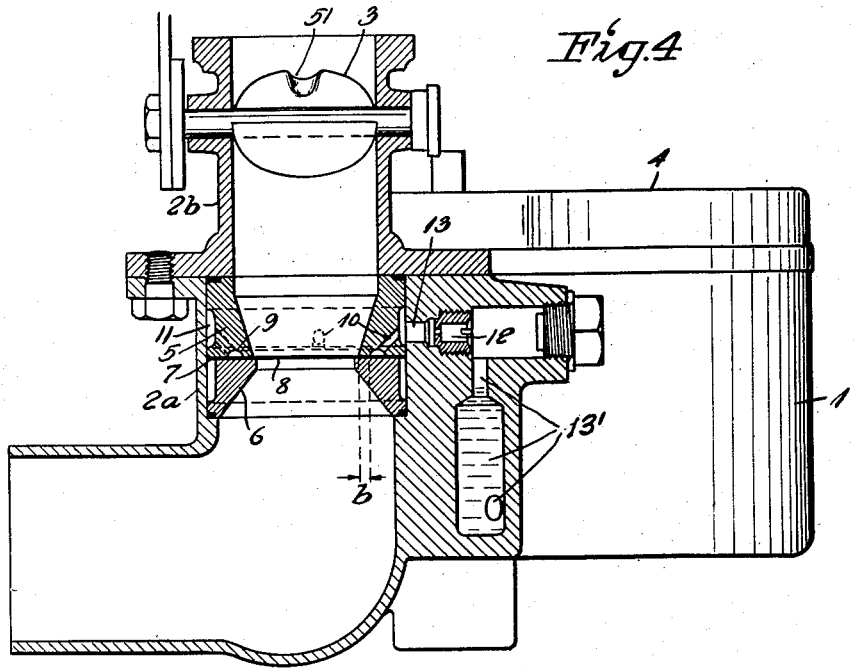
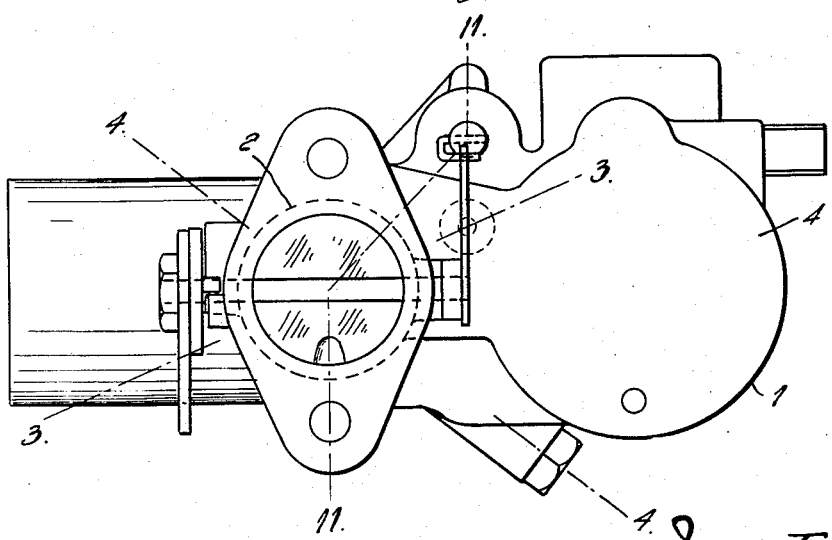

Aug. 27, 1935.  N. G. A. GUSTAFSSON  2,012,665
CARBURETOR
Filed May 7, 1930  5 Sheets-Sheet 3
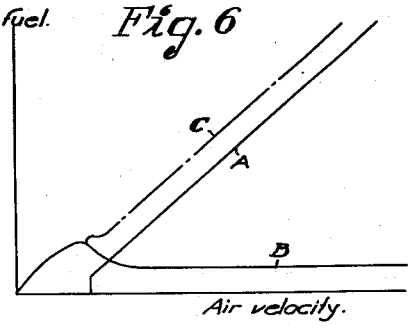
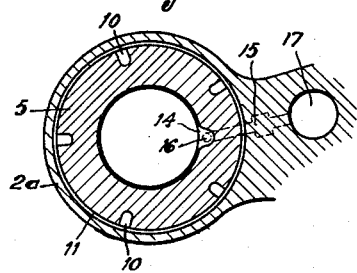
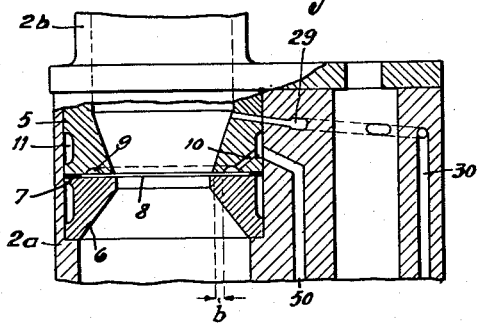
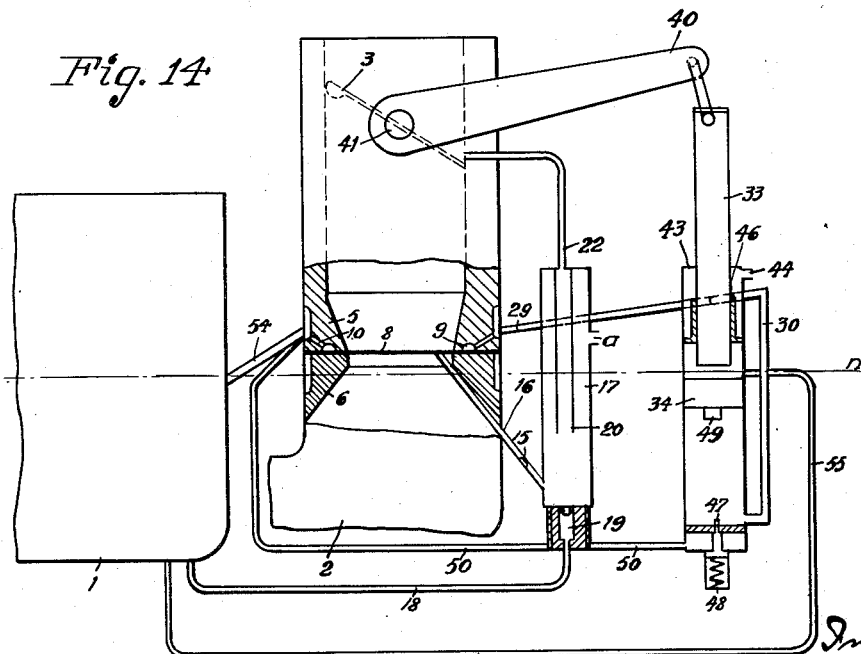

Aug. 27, 1935.  N. G. A. GUSTAFSSON  2,012,665
CARBURETOR
Filed May 7, 1930  5 Sheets-Sheet 4

Inventor:
Nils Gustaf Albert Gustafsson,
By Byrnes, Townsend & Potter,
Attorneys.

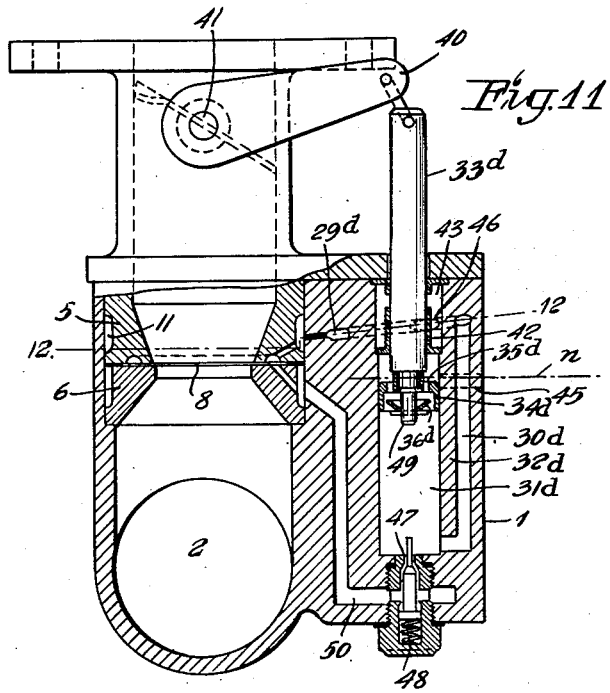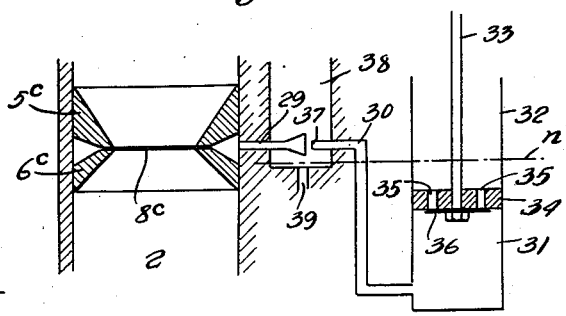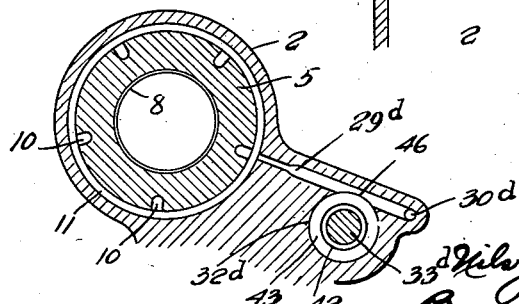

Patented Aug. 27, 1935

2,012,665

UNITED STATES PATENT OFFICE 2,012,665

CARBURETOR

Nils Gustaf Albert Gustafsson, Stockholm, Sweden, assignor to Svenska Ackumulator Aktiebolaget Jungner, Stockholm, Sweden, a Swedish company Application May 7, 1930, Serial No. 450,473
In Sweden February 26, 1930

9 Claims. (Cl. 261—34)

The present invention refers to carburetors for internal combustion engines of the type provided with a spreading device for the fuel introduced into the air induction pipe, in which said spreading device comprises one or more annularly arranged spaces serving as fuel outlets.

In carburetors of this type, as generally in carburetors adapted for automobile engines, it is required that the ratio given by the carburetor between the quantity of air sucked in and the amount of fuel, the so-called mixing ratio, follows certain laws. It has been possible by previous tests carried out with engines to establish the ideal mixing ratio, but owing to the fact that the flow of the air and that of the fuel follow different laws, it has not been possible hitherto to produce a carburetor that would in all respects fulfill the requirements set up.

One object of the present invention is to provide a carburetor which maintains a suitable proportioning of the fuel at all prevalent velocities of the air in the induction pipe, that is to say, one which automatically varies the mixing ratio with changes in air velocity while effecting a satisfactory atomization of the fuel at all air velocities.

A further object of the invention is to provide a carburetor which will supply the requisite quantity of fuel to the engine both at a constant position of the throttle member and at slow opening thereof.

A further object of the invention is to provide an arrangement for additional fuel supply which is of simple construction and reliable in operation, and of such properties that additional fuel will under no conditions be supplied to said induction pipe when the throttle position is constant or is altered very slowly.

In other words, the invention has for one of its purposes to provide a carburetor which, on sudden opening of the throttle valve of the carburetor, will supply the additional fuel which is necessary in order that the engine shall operate during the period of time elapsing before a state of equilibrium has ensued in the induction pipe. This is of paramount importance, particularly in automobile engines, inasmuch as in the latter great weight is attached to the feature that the carburetor be so adjusted that the fuel consumption will be small at the partial loads always occurring in ordinary running.

A still further object of the invention is to render it possible to reduce the mixing ratio at small throttle openings, which is of great importance particularly in automobile engines.

With the above and other objects in view the invention consists essentially in the provision of narrow fuel outlet spaces of certain dimensions having a new and useful character with respect to the flow of fuel in relation to the flow of air. The invention consists further in means, such as an additional fuel outlet, for the supply of fuel at low air velocities and in means for supplying additional fuel at the opening of the throttle.

Figure 2:
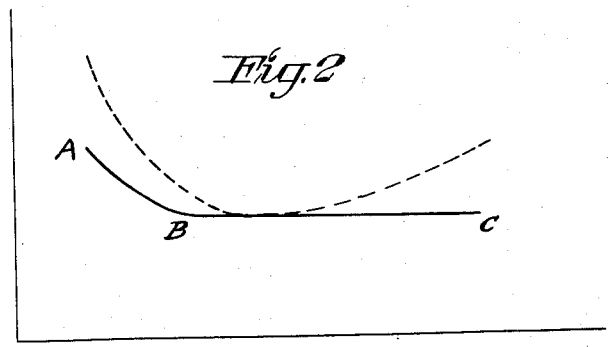
Figure 3:
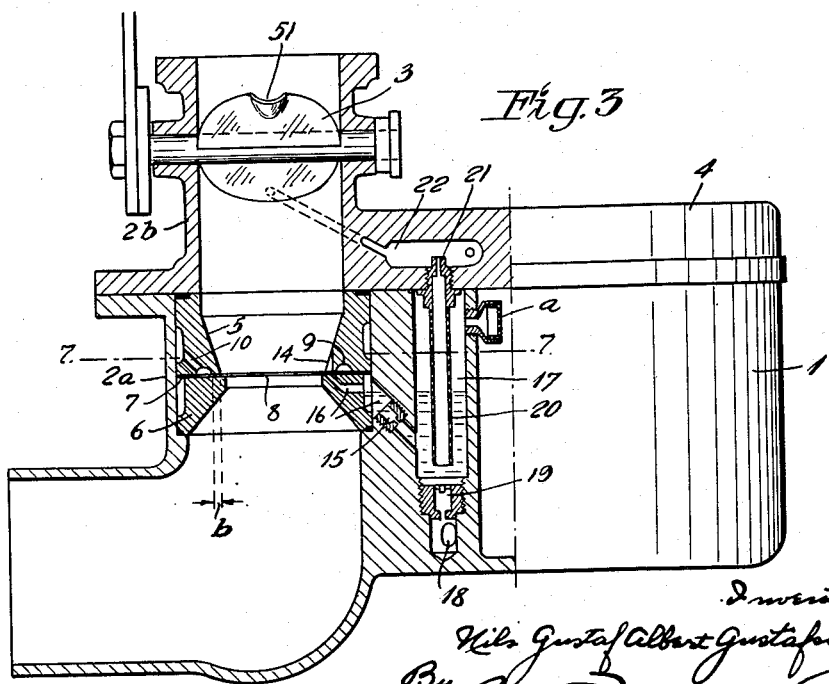
Figure 8:
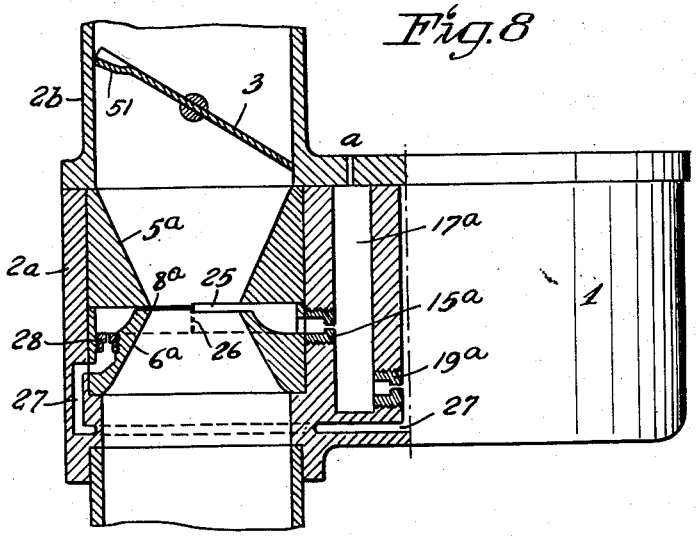
Figure 9:
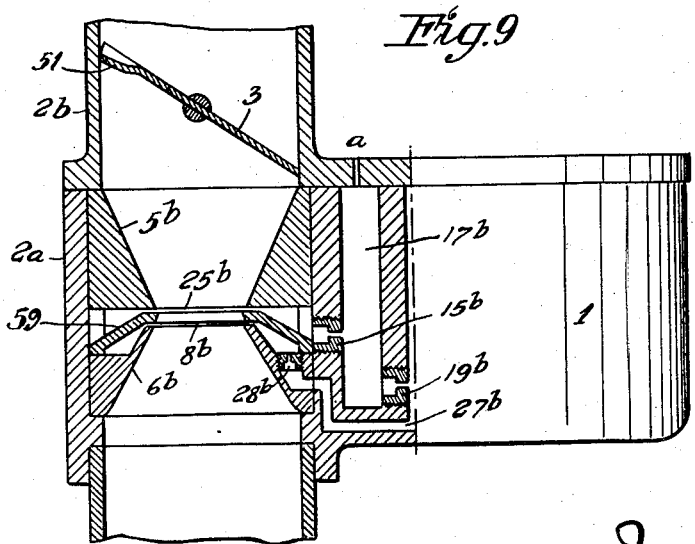

The accompanying drawings illustrate certain embodiments of the invention. Figs. 1 and 2 show curves indicating the mixing ratio. Fig. 3 is an elevation in partial section on line 3—3 in Fig. 5. Fig. 4 is a section on line 4—4 in Fig. 5. Fig. 5 is a top plan view of the carburetor. Fig. 6 is a diagrammatic representation of the relation between the air velocity and the quantity of fuel. Fig. 7 is a cross-section on line 7—7 in Fig. 3. Figs. 8 and 9 are schematic representations of two modifications of the arrangement shown in Figs. 3 and 7. Fig. 10 is a diagrammatic representation of a modified device for supplying additional fuel to the induction pipe. Fig. 11 is a section on line 11—11 of Fig. 5. Fig. 12 is a section on line 12—12 of Fig. 11. Fig. 13 shows a modification of the device shown in Fig. 11. Fig. 14 is a diagrammatic view illustrating the relative arrangement of the various elements of the carburetor.

Fig. 1 illustrates the ideal mixing ratio aimed at, the said ratio (the ordinate) being plotted as a function of the quantity of air flowing through the carburetor (the abscissa). At small air velocities the mixing ratio should be situated at the point A, in order then to fall down to the point B at an increased air velocity. After this the mixing ratio should remain constant or substantially constant up to point C. When the throttle member is entirely open, the mixing ratio should be increased to the point D, in order thus to permit the motor to yield an output as high as possible, without regard to the fuel consumption. This portion C—D of the curve is preferably brought about by an additional nozzle of some type or other.

By reason of the above-stated differences in the laws governing the flow of the air and that of the fuel, it has not been possible, however, with the carburetors as hitherto known to obtain a mixing ratio according to the curve A—B—C shown in Fig. 1.

With the use of a fuel nozzle in conjunction with an annular space for the spreading of the fuel in the air, that is to say in a carburetor device of the type to which the present invention refers, where the said space is arranged at or in the proximity of the smallest cross section of the induction pipe, the nature of flow characteristic of the nozzle device situated in front of the space, counted in the direction of flow, will not be altered.

Tests performed have proved this result which is rendered in Fig. 2. The lower curve A—B—C is the same as that shown in Fig. 1, whereas the upper curve shown with dotted lines indicates the ratio in a carburetor according to the above description with a fuel nozzle in conjunction with an annular space. As will appear from the latter curve, this arrangement gives too rich a mixing ratio at lower air velocities, which is also the case at greater air velocities. By suitably choosing the dimensions of the fuel nozzle these curves may be caused to coverge at that portion of the curve A—B—C which represents about the half of the total quantity of air. The upper curve, however, gives a high fuel consumption at low and high speeds of the vehicle, whereas a satisfactory fuel consumption can be attained only within a limited range of speeds.

Conditions will be entirely different if the annular space is given small dimensions within the above limits, a mixing ratio according to the curve A—B—C aimed at being then obtainable.

At low air velocities, i. e. at the point A, the flow of fuel from the nozzle through the space is now counteracted by a comparatively small resistance, and for this reason the desired relatively rich mixing ratio can be obtained. At an augmented air velocity the discharge through the nozzle and the space is actuated so that the same is impeded, by reason of which the mixing ratio falls until the point B has been reached. At a further increase of the air velocity and thus at an increased fuel consumption per unit of time, the space in conjunction with the nozzle will give the discharge the nature of a purely turbulent flow, the same law being then obtained for the flow of the fuel as for that of the air. Here, the result will be a constant mixing ratio at a further increase of the air velocity up to point C where, as stated, an additional nozzle may be caused to function, in order to obtain the curve portion C—D, Fig. 1.

In the embodiment of the carburetor shown in Figs. 3-5, 7, 11 and 12, I designates the ordinary float casing for the fuel and 2 the air induction pipe connected therewith, said induction pipe being provided with the throttle valve 3. The lower portion 2a of said pipe is here made integral with the float casing proper, whereas the upper portion 2b containing the valve 3 is made integral with the cover 4 of said casing. In the first mentioned of said pipe portions are arranged two rings 5 and 6 of a conical shape internally, the base surfaces of the conical openings being directed from each other. Provided between these two rings at their outer circumference is a thin washer 7, so that a narrow annular space 8 is formed between the rings, said space having a height which is to be between the limits 0.08–0.6 or between 0.12–0.3 millimetres, according to the invention. This space 8, the depth b of which should, according to the invention, be within the limits 0.5–3 millimetres, is in communication with an annular channel 9 formed between the rings 5, 6, said channel 9 being connected with an annular chamber 11 situated between the ring 5 and the induction pipe 2a. This chamber is connected with the fuel container in the float casing 1 through a channel 13 provided with a nozzle 12 and through a channel arrangement 13, Fig. 4.

The induction pipe also has connected thereto a channel 16 offering less resistance to the flow of fuel than the spraying space 8 and provided with a nozzle 15, Fig. 3, said channel communicating with a chamber 17 in connection with the atmosphere as at a, fuel being admitted to said chamber from the float casing through a channel 18 and a nozzle 19. The channel 16 is intended at acceleration to supply fuel at low air velocities, and the nozzle 15 thereof admits the passage of a quantity of fuel of such magnitude that the level in the chamber 17 will fall at low air velocities, so much that air is also being sucked in through the nozzle 15. The nozzle 19 then limits the quantity of fuel supplied which can never increase beyond the quantity admitted by this latter nozzle at the small suction height corresponding to the difference in the levels between the liquid surface in the float casing 1 and the outlet to the nozzl 15. The quantity of fuel admitted through the nozzle 15 is, in other words, constant and independent of the velocity of the air flowing through pipe 2. Extending down into the chamber 17 is a pipe 20 provided at the upper end with a nozzle 21 opening into a channel 22 communicating with the atmosphere and with the induction pipe, said nozzle being adapted to supply fuel for no-load running.

The inner diameter of the lower ring 6 in the induction pipe is somewhat smaller than the corresponding diameter of the upper ring 5 at the space 8, so that a projecting annular edge is formed here.

By giving the space 8 the dimensions indicated above, the same will act as a proportioning member with the desired properties indicated above.

By further arranging the space at the smallest section of the induction pipe where the air velocity is greatest, an effective atomization of the fuel is obtained.

Finally, by making the preceding portion of the space (the ring 6), counted in the direction of flow, with a somewhat smaller diameter than the succeeding portion (the ring 5), so that a projecting edge is produced here, an air whirl will be produced when the air flows past, said whirl effecting a thorough atomization of the quantity of fuel discharged through the space.

The channel 16 provided with the nozzle 15 and connected to the induction pipe opens, in the embodiment shown, at the annular space 8 into a recess 14 provided in the upper ring 5, so that the outlet for the channel 16 will be independent of said space. Evidently, the channel 16 may also open at some other point within the induction pipe, but preferably said channel should, the same as the space 8, open at the narrowest section of the pipe, as shown, where the air velocity is the greatest and thus the suction most powerful. The cross-section of the channel 16 should be in excess of 2 square millimeters.

In the co-ordinate system shown in Fig. 6, the abscissa represents the air velocity in meters per second and the ordinate the quantity of fuel in grams per second. The curve A indicates the quantity of fuel sucked out of the annular space 8 at different air velocities, while curve B indicates the corresponding relation at the fuel outlet 16 arranged independently of said space. Curve C resulting from the said curves A and B represents the relation between the fuel quantity and the air velocity, when the annular space as well as the additional outlet are in operation. The portion $t$ of curve B adjacent to origin indicates the no-load relation.

As will be found from curve A, suction of fuel through the annular space 8 takes place only after a certain air velocity has been established. Thus no fuel will be supplied through said space at lower air velocities, which results in a mixing ratio which is too poor to permit the starting of a vehicle, as stated above. However, by switching in the above mentioned fuel outlet 16, which is independent of the annular space, an additional amount of fuel is obtained in direct connection to the fuel for no-load running, even at very small air velocities, as will appear from curve B, whereby the above mentioned disadvantage is avoided. As will be further seen from curve B, the supply of fuel through said additional outlet 16 only rises to a certain limit and then drops to some extent remaining constant independently of the air velocity.

In the modification shown in Fig. 8, the special fuel outlet supplied with fuel by way of nozzle $19^a$, chamber $17^a$ and nozzle $15^a$ is made in the form of a semi-circular space 25 formed between the rings $5^a$ and $6^a$, said space 25 being separated by a partition 26 from the semi-circular main fuel space $8^a$ formed between the same rings, said fuel being supplied from the float casing 1 through a channel 27 and a nozzle 28. As will be seen from the drawings, the height of the space 25 is considerably greater than the height of the space $8^a$ for the main fuel, which latter height shall be within the limits indicated above.

In the embodiment according to Fig. 9, a washer 59 is provided between the rings $5^b$ and $6^b$, between which washer and rings there are formed two separate annular spaces $8^b$ and $25^b$, of which the lower and narrower space $8^b$ is intended for the main fuel and communicates with the float casing 1 through the nozzle $28^b$ and the channel $27^b$, while the upper and larger space $25^b$ is in communication with the chamber $17^b$ through the nozzle $15^b$, to which chamber fuel is supplied from the float casing through the nozzle $19^b$ in the same manner as in the embodiment according to Figs. 3 and 7.

The mode of operation of the embodiments shown in Figs. 8 and 9 is the same as that described above in connection with Figs. 3 and 7.

In Fig. 10 of the drawings, 2 designates the induction pipe of the internal combustion engine, in which there are provided two internally conical rings $5^c$ and $6^c$ with the base areas directed from each other, said rings being arranged at a small mutual distance, so that a narrow annular space $8^c$ is formed between them, said space serving as a spreading means for the main fuel which is supplied thereto from the float casing of the carburetor through a channel arrangement and a nozzle, as described above. Said spreading device communicates through a channel arrangement 29, 30 with the pressure chamber 31 in the cylinder 32 of a pump, the piston rod 33 of which is adapted to be connected with the rotary shaft of the throttle valve, as shown in greater detail in Fig. 11. The pump piston 34 is provided with bore holes 35, through which fuel is supplied to the pressure chamber 31 during the suction stroke of the piston 34, and which are closed by the working stroke by means of a covering disk 36 movable axially within certain limits and provided on the pressure side of the piston.

The channel arrangement 29, 30 in Fig. 10 between the pressure chamber 31 and the spreading device $8^c$ is provided with an interruption, as at 37, which the fuel has to pass, in order to come to the spreading device. In order that this may take place, the fuel must be caused to assume the form of a jet, and this, on the other hand, is dependent on the pump pressure, that is to say, on the speed of the piston during the working stroke. If this speed is small, which will be the case with slow movements of the throttle valve connected with the pump piston, no fuel will be conveyed to the spreading device and the induction pipe 2 of the motor, said fuel being discharged at 37 and collected, if desired, in a container 38 in communication with the atmosphere. The fuel outlet 37 is situated above the normal fuel level in the carburetor, which level is denoted by the chain-dotted line $n$. The container 38 may be suitably connected with the fuel container of the carburetor (the float casing). At quick piston movements a liquid jet is formed, and the additional fuel required, for instance, for starting or acceleration purposes is conveyed further through the channel 29 to the induction pipe 2. From the container 38 the fuel may be drawn off through an opening 39.

In Figs. 11 and 12 of the drawings, showing an arrangement similar to that illustrated in Fig. 10 as applied to a carburetor according to Figs. 3, 4, 5 and 7, 2 designates the induction pipe of the motor, 5 and 6 the rings provided therein, 8 the narrow annular space provided between said rings, which parts may be, and preferably are, substantially identical with the correspondingly identified parts illustrated in Figs. 3, 4 and 5. Channels $29^d$ and $30^d$ provide communication between the spreading space 8 and the pressure chamber $31^d$ of the pump cylinder $32^d$, which is here shown as formed in the carburetor casing 1. The piston rod $33^d$ is connected to an arm 40 fixed on the rotary shaft 41 of the throttle valve 3 of the carburetor. The pump piston $34^d$ is provided with passages $35^d$ and an axially movable disk $36^d$; the construction of the pump thus conforming to that shown diagrammatically in Fig. 10.

Here, a flanged bushing 42 is provided in the upper part of the pump cylinder 32, said bushing constituting a guide for the piston rod 33 while also forming a limit against the lower portion of the pump cylinder, so that a container or chamber 43 is formed in the upper part, corresponding to the container 38 shown in Fig. 10 and communicating with the atmosphere through an opening 44. Fuel is supplied to the pump cylinder 32 through the channel 55 indicated by dotted lines and shown more plainly in the diagrammatic view, Fig. 14.

As will appear from Fig. 12, the fuel channel 29 is tangentially connected to the pump cylinder 32 or the chamber 43 formed therein, and is at the point of contact provided with an opening 46 (corresponding to the interruption 37 in Fig. 10) directed toward this chamber, through which opening the major part of the fuel escapes to the chamber 43 at slow piston speeds, and is thus not conveyed further to the spreading device 6 and the induction pipe in the manner described in connection with Fig. 10. At great piston movements (quick opening of the throttle valve), on the other hand, the fuel is given the form of a jet and is forced to the spreading device, whereby the additional fuel required for the start or the acceleration is supplied to the motor, part of the fuel being forced into the chamber 43.

The fuel which is collected in the chamber 43 may partly be returned to the fuel container of the carburetor or to the pump cylinder 32, for instance by providing an axially extending slot in the bushing 42 beside the piston rod 33, said slot serving as a means of communication between the chamber 43 and the pump cylinder, the upper edge of the bushing 42 then serving as an overflow outlet. In place of the said slot, a small play may be provided between the piston rod and the bushing, through which fuel may flow from the chamber 43 to the pump cylinder. The fuel in the chamber 43 above and in level with the opening 46 is sucked out through the said opening and supplied to the induction pipe, whereby an advantageous after-effect is obtained.

In the bottom of the pump cylinder 32, from which the channel 30 also extends, there is provided a needle-valve 47 actuated by a spring 48, said valve being actuated in the lower position of the pump piston 34 by a pin 49 projecting from the piston rod 33, the valve thus opening communication, through a channel 50, between the pump cylinder and the space 8 and the induction pipe, when the throttle is fully open or approximately so. The needle-valve will thus act as a throttling nozzle, and additional fuel will be supplied to the motor, which latter is now intended to develop an output as high as possible, without regard to the fuel consumption.

If the throttle opening is then reduced, the piston rod 33 will at the same time be moved out of contact with the needle-valve 47, the latter then cutting off the fuel supply to the passage 50.

In normal operation, when additional fuel is not to be supplied to the motor, either through the channels 29, 30 or the channel 50, air will always be sucked in through the opening 46 in the channel 29. In order then to prevent fuel from being sucked in from the channel 30 connected with the channel 29, in which first-mentioned channel the fuel level $n$ is the same as in the float casing 1, the opening 46 is disposed at a lower level than the uppermost portion of the channel 30, besides which said portion is situated at a distance from the fuel level $n$ as required for the purpose.

Obviously, additional fuel from the pump or from the passage 50 need not be introduced into the induction pipe through the spreading device adapted for the main fuel, it being also possible to introduce said fuel into the induction pipe at some other point or points, as shown in Fig. 13.

With a ring nozzle of the type as indicated above, a certain minimum air velocity through the induction pipe is required, however, as above stated, before fuel commences to flow out through the space 8. Thus, if in operating the motor in no-load running the throttle valve is suddenly opened, the air velocity will be so low that no fuel is supplied through the narrow space 8, by reason of which the motor may stop. This is avoided, however, by supplying additional fuel by means of the pump 32, 34.

The comparatively large amount of additional fuel required for the start or the acceleration should not, however, be supplied to the air all at one time, but should be suitably portioned. This may be attained by also supplying this fuel through the annular space 8, as shown in Fig. 11. Hereby the proper mixing ratio is obtained even during the period of acceleration, in addition to which the advantage is gained that by this fuel stream caused by the pump the discharge through the main nozzle is accelerated. It is evident that a special annular space similar to the space 8 may be arranged in the induction pipe for the additional fuel.

What I claim as new and desire to secure by Letters Patent of the United States of America is:—

1. A carburetor for internal combustion engines, comprising a fuel casing, a main air induction pipe, a spraying device for the fuel in said induction pipe, said spraying device comprising members forming at least one narrow annularly arranged space opening into said induction pipe the height of said space being not greater than 0.6 millimeter, and a communication between said fuel casing and said spraying device including a calibrated orifice, said communication being uninterrupted between said orifice and said spraying device, a second outlet for additional fuel in said induction pipe offering less resistance to the flow of fuel than the said spraying device for the main fuel, and an air-vented communication between said fuel casing and said second fuel outlet.

2. A carburetor for internal combustion engines, comprising a fuel casing, a main air induction pipe, a spraying device for the fuel in said induction pipe, said spraying device comprising members forming at least one narrow annularly arranged space opening into said induction pipe, the height of said space being not greater than 0.6 millimeter, and a communication between said fuel casing and said spraying device including a calibrated orifice, said communication being uninterrupted between said orifice and said spraying device, a second outlet for additional fuel in one of the members forming the spraying device for the main fuel supply offering less resistance to the flow of fuel than the said spraying device for the main fuel, and an air-vented communication between said fuel casing and said second fuel outlet.

3. A carburetor for internal combustion engines, comprising a fuel casing, a main air induction pipe, a spraying device for the fuel in said induction pipe, and in communication with said fuel casing, a pump device having its pressure chamber in communication with said induction pipe for the supply of additional fuel thereto, said pressure chamber communicating with said fuel casing, a fuel passage between said pressure chamber and said induction pipe, said passage comprising two sections whose adjacent ends are spaced apart to provide an opening to atmosphere and being adapted for the passage of fuel past said opening in the form of a jet to said induction pipe through said fuel passage when the pressure established in said pressure chamber has more than a predetermined value.

4. A carburetor for internal combustion engines, comprising a fuel casing, a main air induction pipe, a spraying device for the fuel in said induction pipe, and in communication with said fuel casing, a pump device having its pressure chamber in communication with said induction pipe for the supply of additional fuel thereto, said pressure chamber communicating with said fuel casing, a fuel passage between said pressure chamber and said induction pipe, said passage comprising two sections whose adjacent ends are spaced apart to provide an opening to atmosphere and the end of the passage section adjacent said fuel chamber constituting a nozzle for projecting fuel past said opening to said induction pipe through said fuel passage when the pressure established in said pressure chamber has more than a predetermined value.

5. A carburetor for internal combustion engines, comprising a fuel casing, a main air induction pipe, a spraying device for the fuel in said induction pipe, and in communication with said fuel casing, a pump device having its pressure chamber in communication with said induction pipe for the supply of additional fuel thereto, said pressure chamber communicating with said fuel casing, a fuel passage between said pressure chamber and said induction pipe, said passage comprising two sections whose adjacent ends are located at or above the normal fuel level and spaced apart to provide an opening to atmosphere and being adapted for the passage of fuel past said opening in the form of a jet to said induction pipe through said fuel passage when the pressure established in said pressure chamber has more than a predetermined value.

6. A carburetor for internal combustion engines, comprising a fuel casing, an air induction pipe connected to said fuel casing, a spraying device for the fuel in said induction pipe and in communication with said fuel casing, a pump comprising a cylinder and a piston movable therein, a fuel passage providing communication between the pressure side of said pump and the induction pipe said fuel passage having a straight portion adapted for the injection of the fuel in the form of a jet, and means cooperating with the pump cylinder to define a container open to atmosphere and located at the end of said cylinder opposite the pressure side of said piston, said fuel passage being provided at or above the normal fuel level with an opening affording communication with said container.

7. A carburetor for internal combustion engines, comprising a fuel casing, an air induction pipe connected to said fuel casing, a spraying device for the fuel in said induction pipe and in communication with said fuel casing, a pump comprising a cylinder and a piston movable therein, a fuel passage providing communication between the container portion of the pump cylinder and the induction pipe and extending tangentially to said pump cylinder, said fuel passage having a straight portion adapted for the injection of the fuel in the form of a jet, and means cooperating with the pump cylinder to define a container open to atmosphere and located at the end of said cylinder opposite the pressure side of said piston, said fuel passage being provided at or above the normal fuel level with an opening affording communication with said container.

8. A carburetor for internal combustion engines, comprising a fuel casing, a main air induction pipe, a spraying device for the fuel in said induction pipe, said spraying device comprising members forming at least one narrow annularly arranged space opening into said induction pipe, the height of said space being not greater than 0.6 millimeter, and a communication between said fuel casing and said spraying device including a calibrated orifice, said communication being uninterrupted between said orifice and said spraying device, a second outlet for additional fuel in said induction pipe offering less resistance to the flow of fuel than the said spraying device for the main fuel and arranged to direct the fuel jet escaping therefrom at an angle not exceeding 90° to the direction of the flow of air through the induction pipe, and an air-vented communication between said fuel casing and said second fuel outlet.

9. A carburetor for internal combustion engines, comprising a fuel casing, a main air induction pipe, a spraying device for the fuel in said induction pipe and in communication with said fuel casing, a pump device having its pressure chamber in communication with said induction pipe for the supply of additional fuel thereto, said pressure chamber communicating with said fuel casing, a fuel passage between said pressure chamber and said induction pipe and comprising a container open to atmosphere, said fuel passage being adapted to allow fuel as a jet to pass through said container to said induction pipe when the pressure established in said pressure chamber has more than a predetermined value.

NILS GUSTAF ALBERT GUSTAFSSON.